United States Patent [19]

Brodribb et al.

[11] 4,449,317
[45] May 22, 1984

[54] FISHING APPARATUS

[76] Inventors: Marcus T. Brodribb, Wharf St., Currie, King Island, Tasmania; Anthony G. Brodribb, Bunton Ave., Triabunna, Tasmania; David H. Baillie, 2 Salacia Ave., Mermaid Waters, Queensland, all of Australia

[21] Appl. No.: 336,336

[22] Filed: Dec. 31, 1981

[30] Foreign Application Priority Data

Oct. 8, 1981 [AU] Australia ............................ PF1111

[51] Int. Cl.³ .................. A01K 89/017; A01K 89/02
[52] U.S. Cl. ......................................... 43/15; 43/26.1; 192/15; 192/18 B; 242/84.1 A; 242/84.52 A; 242/84.52 B; 242/106; 254/269; 254/318; 254/366
[58] Field of Search ............... 43/16, 15, 21, 26.1; 192/12 D, 18 B, 15, 84 A; 242/106, 84.1 A, 84.52 A, 75.3, 84.52 B; 254/269, 318, 319, 321, 366, 317, 322, 300, 318

[56] References Cited

U.S. PATENT DOCUMENTS

| 1,360,429 | 11/1920 | Michaelis | 43/15 X |
|---|---|---|---|
| 3,355,835 | 12/1967 | Lyons | 43/6.5 |
| 3,365,833 | 1/1968 | Christiansen | 43/15 |
| 3,664,054 | 5/1972 | Pickering | 43/42.72 X |
| 3,696,545 | 10/1972 | Gudjonsson | 43/15 |
| 3,738,461 | 6/1973 | Brooks et al. | 192/12 D X |
| 3,978,948 | 9/1976 | Baer | 192/18 B |
| 4,253,165 | 2/1981 | Christiansen | 43/4 X |
| 4,344,587 | 8/1982 | Hildreth | 43/26.1 X |
| 4,349,977 | 9/1982 | Brodribb et al. | 43/15 |
| 4,384,427 | 5/1983 | Christiansen | 43/26.1 |

FOREIGN PATENT DOCUMENTS

| 997579 | 1/1952 | France | 254/317 |
|---|---|---|---|
| 1260717 | 12/1961 | France | 254/317 |
| 109542 | 8/1925 | Switzerland | 192/15 |
| 2030431 | 4/1980 | United Kingdom | 43/15 |

Primary Examiner—Nicholas P. Godici
Assistant Examiner—Charles L. Willis
Attorney, Agent, or Firm—Larson and Taylor

[57] ABSTRACT

This invention provides automatic fishing apparatus for trailing line fishing. The trailing line is supported on a reel which is adapted to be coupled or uncoupled with driving means to enable the line to be reeled in or let out. The selective coupling of the reel with the driving means is in response to variations in the line tension caused by a fish being hooked on the line.

12 Claims, 5 Drawing Figures

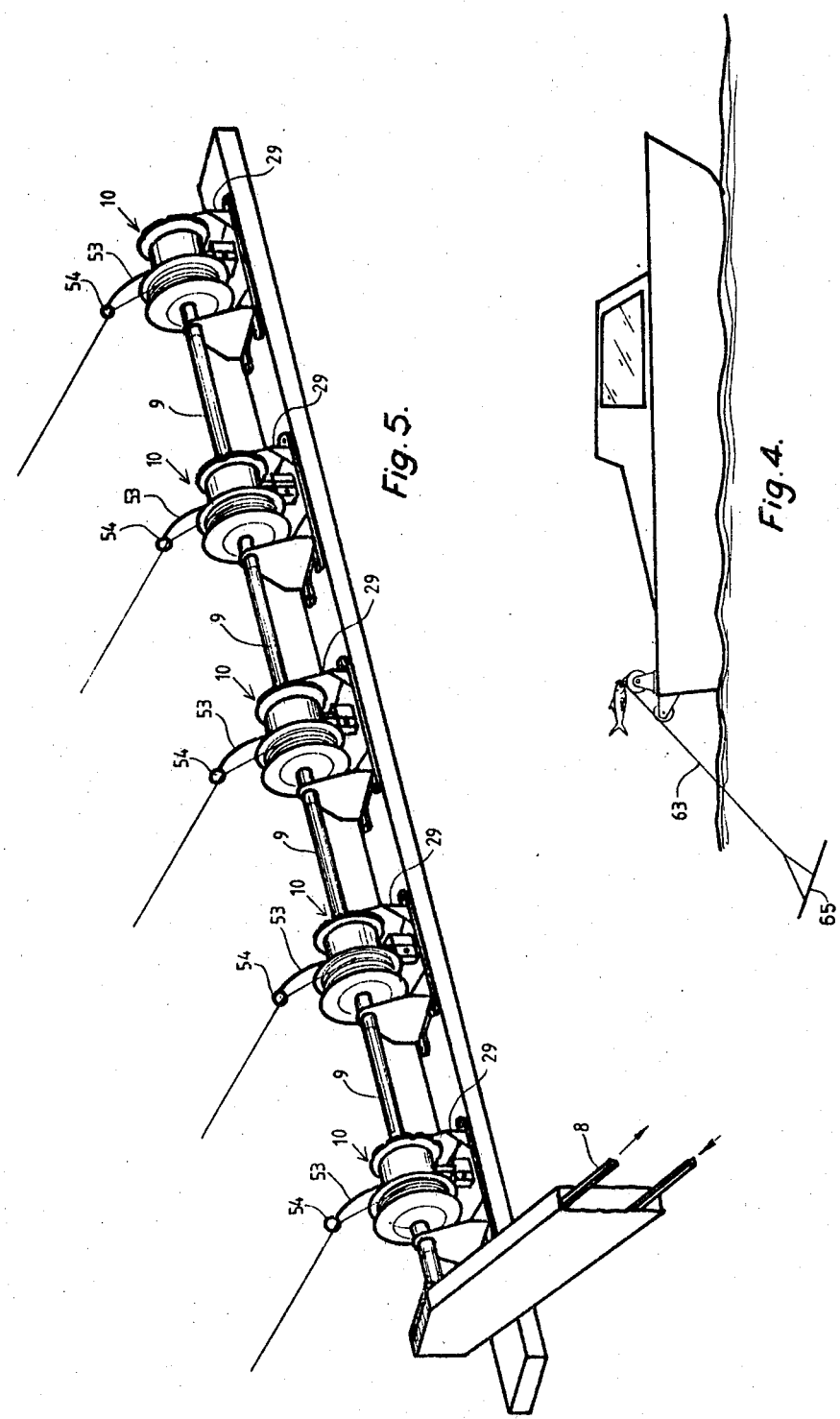

FISHING APPARATUS

FIELD OF THE INVENTION

This invention relates to improvements to fishing apparatus.

BACKGROUND OF THE INVENTION

Automatic reel type fishing apparatus has been proposed in the past but such apparatus has not been put into widespread use as a result of operating difficulties associated with the earlier apparatus and which often led to inefficient operation of the apparatus due to the need for manual supervision of the apparatus to say prevent tangling of lines. Furthermore, such fishing apparatus operates in an extremely hostile environment and the prior proposals have not been arranged in order to enable the fishing apparatus to operate for extended periods without frequent maintenance.

Typical of such earlier automatic fishing apparatus is that described in United States patent application Ser. No. 127,090, now U.S. Pat. No. 4,349,977 in the name of M. T. & A. G. Brodribb and U.S. Pat. No. 3,696,545 in the name of E. N. Gudjonssen. The fishing apparatus described therein utilizes direct acting mechanical means for controlling the operation of the reel and such mechanical actuating means is adapted to be engaged and disengaged directly by the tension in the fishing line. It has been found that such apparatus has only a limited useful service life necessitating frequent maintenance.

SUMMARY OF THE INVENTION

It is an object of the present invention to provide fishing apparatus which will alleviate the disadvantages of the prior art type apparatus and which will operate reliably and efficiently in use. Other objects and advantages of the invention will hereinafter become apparent from the following description.

With the foegoing and other objects in view this invention resides broadly in fishing apparatus including a reel assembly for holding a fishing line, said reel assembly being mounted rotatably on a rotatable driving shaft and there being provided actuating means for selectively coupling said reel assembly to said driving shaft so that said reel assembly may rotate with said driving shaft to reel in said line, said actuating means being operatively associated with a line monitoring means adapted to monitor selected line tension variations to control said actuating means to allow relative movement between said driving shaft and said reel assembly or cause said reel assembly to be coupled to and to rotate with said driving shaft.

Preferably the line monitoring means is operatively associated with braking means adapted upon actuation to prevent rotation of said reel assembly.

Suitably, the line monitoring means is a strike-arm having a line guide through which the line passes and which may be pivoted in either direction of line pull in accordance with operating conditions. However, other means of sensing tension may be utilized if desired. For example this could include a member which is adapted for linear extension along said line depending upon the applied line tension, or alternatively it would include electronic sensing means adapted to monitor a property of the line which varies with tension.

Preferably the actuating means is a disc-type clutch assembly however it may be for example, a dog clutch assembly on a ratchet mechanism or other as desired. Suitably the actuating means is adapted to be actuated by an electromagnetic actuator, but of course it could be operated mechanically or hydraulically or otherwise if desired.

Suitably the fishing apparatus is mounted upon a driving shaft adapted to be driven continuously in use. However, if desired it may be supported on a shaft adapted to be selectively coupled to drive means.

BRIEF DESCRIPTION OF THE DRAWINGS

In order that the invention may be more readily understood and put into practical effect, reference will now be made to the accompanying drawings which illustrate preferred forms of automatic fishing apparatus of the present invention and wherein:

FIG. 4 illustrates a preferred form of line arrangement,

FIG. 5 is a perspective view showing the mounting arrangement for a plurality of reels according to this invention.

DETAILED DESCRIPTION OF THE PREFERRED EMBODIMENTS

Figure 1:
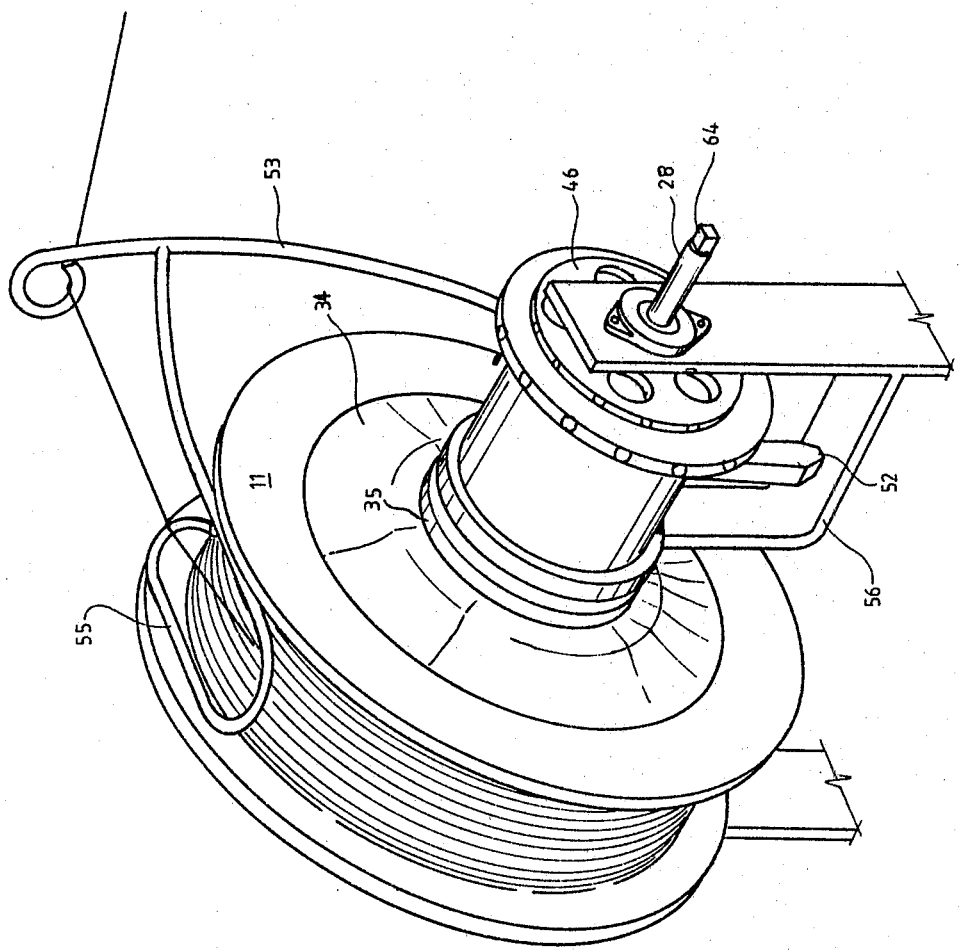
FIG. 1 is a perspective view of an automatic fishing apparatus.

The fishing apparatus 10 of the embodiment illustrated in FIGS. 1 to 4 includes a drum type reel assembly 11 provided with peripheral side flanges 12 to contain the fishing line wound about the drum like body portion 13 of the reel assembly 11. Suitably the reel assembly is a two part assembly including a support part 14, which is mounted rotatably by the bearing assembly 15 on the tubular lay-shaft 16, and a side part 17 which is adapted to be through bolted by the bolts 18 to the support part 14. As illustrated, the support part 14 includes an outer portion 19 preferably formed of plastics material formed about a metal hub portion 20 which is manufactured to carry the bearing assembly 15. The hub portion 20 is provided with peripheral serrations or grooves 21 so as to positively key to the outer portion 14 which rotates therewith. As shown, the hub portion 20 is provided with an annular recess 22 within which a correspondingly shaped electro-magnet assembly is nested in spaced relationship therewith and supported on the plate 24 mounted rigidly on the lay-shaft 16. The outer face 25 of the hub portion 20 opposite to the annular recess 22 forms a clutch surface which is adapted to co-operate with the clutch assembly 26 which is adapted to be actuated by the electromagnetic actuator 23.

The clutch assembly 26 is secured to the boss 27 fixed to the drive shaft 28. The latter passes rotatably through the lay-shaft 16 and is suitably supported by upstand member 29 arranged at opposite sides of the fishing apparatus 10 as illustrated. The boss 27 is provided with a peripheral groove 30 to receive a weather proofing cover plate 31 which is fixed to and rotates with the reel assembly and an O-ring sealing member 32 is interposed between the complementary planar engagement faces 33 of the reel parts 14 and 17 so as to prevent ingress of moisture into the interior of the apparatus, while a further sealing cover plate 34 is carried by the side part 17 to engage sealingly within the peripheral groove 35 extending around the fixed control housing 36.

Within the control housing 36 there is provided a brake assembly 41 cooperable with a fixed hub portion 37, similar to the hub portion 20, but fixed against rotation on the lay-shaft 16. The fixed hub portion 37 is also provided with an annular groove 38 in which a further electro-magnetic actuator 39 is nested. The hub portion 37 provides a friction face 40 adapted to co-operate with the friction plate carried on the end plate 42 located by the bolts 18 within a recess 43 in the end of the side part 17.

The electro-magnetic actuator 39 is supported by the carrier plate 44 fixed to the lay shaft 16. This plate 44 together with the fixed hub portion 37 supports the control housing 36 which extends beyond the plate 44 to support an internally threaded flange member 45. A drag or lever pivot control wheel 46 having an exteriorally threaded hub 47 is adapted to be advanced through the flange member 45 to clamp the collar 48 between its end face 49 and the thrust washer 50 and a further thrust washer 51 is carried between the end of the hub 47 and the collar 48. A locking wheel 62 is provided for wheel 46. The collar 48 is freely rotatable about the lay-shaft 16 and carries a downwardly extending control arm 52 which projects through the slot 53 in the control housing 36. The arm 52 supports the strike arm 53 which extends upwardly in spaced relationship with the control housing to provide a fishing line guide eye 54 located centrally above the drum 13. Additionally, the strike arm 53 supports an elongate lead ring 55 disposed within the confines of the peripheral side flanges 12 of the line containing portion of the reel and the line is fed to the guide eye 54 through the ring 55 to prevent spillage of line from the drum.

Figure 3:
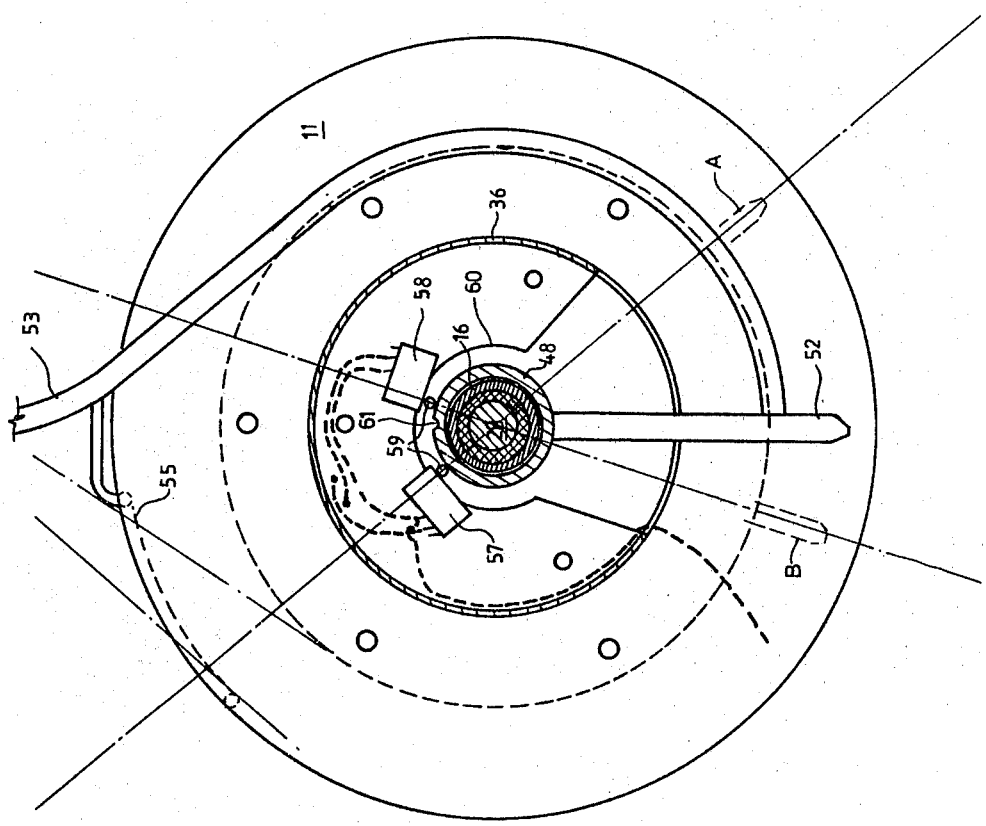
FIG. 3 is an end view of the apparatus illustrated in FIG. 1, partly in cross-secteon to illustrate the control mechanism.

The control housing 36 is fixed against rotation by the locating member 56 which is supported by the upstanding member 29 such that the housing 36 together with the fixed hub portion 37 and the lay-shaft 16 are supported fixedly so that they cannot rotate. Thus if the electro-magnetic actuator 23 is actuated the clutch assembly 26 is engaged and, the reel assembly 11 is coupled to the driving shaft 28 through the clutch assembly 26 so that the reel assembly 11 will rotate therewith. If the electro-magnetic actuator 39 is actuated the brake assembly 41 will be activated to anchor the reel assembly to the fixed hub portion 37 so that the reel assembly will be held against rotation even though the shaft 28 continues to rotate and provided of course that the clutch assembly 26 is disengaged. In order to control actuation of the clutch assembly 26 and the brake assembly 41 there is provided a pair of spaced apart limit switches 57 and 58 carried, as can be seen in FIG. 3, on the carrier plate 44. The actuating members 59 of the respective limit switches 57 and 58 are positioned in contact with the outer cylindrical surfaces 60 of the collar 48 which supports the control arm 52 and it will be seen that the collar 48 is provided with an indent 61 into which a respective actuating member 59 may extend to switch the respective limit switches 57 or 58 to an on position. Accordingly, operation of the reel assembly is controlled by the angular position of the control arm 52 relative to the carrier plate 44.

Figure 2:
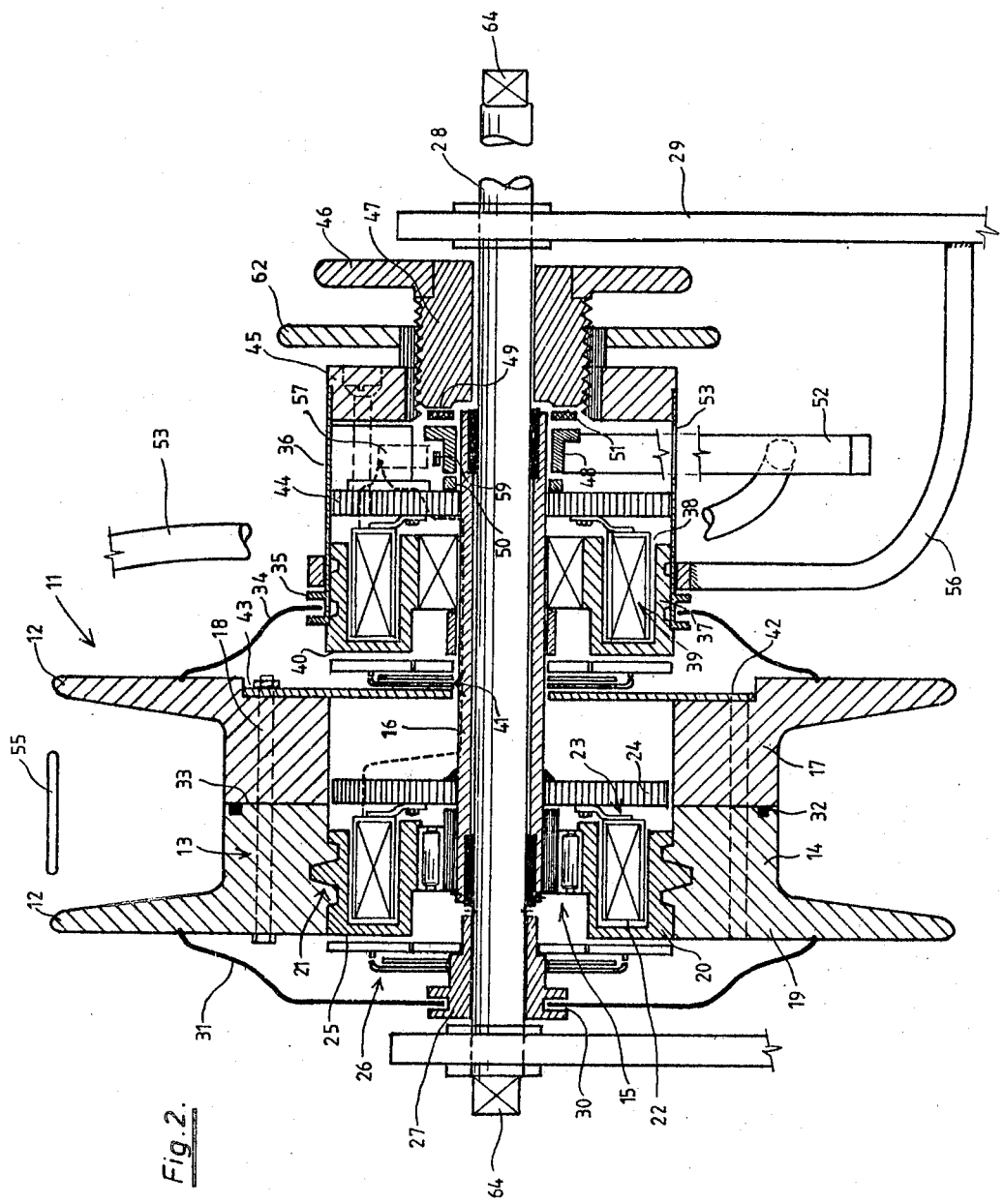
FIG. 2 is a cross-section view of the automatic fishing apparatus illustrated in FIG. 1.

The control arm 52 is held, during trolling operations in the neutral position as shown in FIG. 2, such that neither the clutch assembly 26 nor the brake assembly 41 is actuated. In this position the reel will be in the fully unwound position and the trolling line tension will be applied to the control arm 52 so as to urge the arm towards the position 'A'. The control arm 52 is maintained in the neutral position by adjustment of the drag control wheel 46 to sufficiently clamp the the collar 48 against the carrier plate 44 to resist rotation of the control arm. When a fish is caught on the line the additional line drag will cause the strike arm 53 to move rearwardly towards the fish which will cause the control arm 52 to move to position 'A' whereupon the actuating member 59 for the limit switch 57 will drop into the indent 61 and the switch 57 will actuate the clutch assembly 26. This will immediately connect the reel assembly 11 with the driving shaft 28 to cause the fish to be reeled in. As the fish is drawn from the water it will be reeled in until it strikes the guide eye 54 where upon the line tension and the momentum of the fish will rotate the strike arm 53 to its opposite extreme position such that the control arm 52 will move to position 'B'. This action firstly causes the clutch assembly 26 to be disengaged as the actuating member 59 for the limit switch releases from the indent 61 and then the switch 58 will cooperate with the indent 61 to activate the brake assembly 41 and lock the reel against rotation. It will be found in use that if the barbless hook is used the action of the fish striking the guide eye 54 will disengage the fish from the hook and the fish will be thrown forwardly onto the deck of the boat.

In use the control wheel can be set such that the trolling line tension due to the lure or bait fish will not move the control arm 52 to its position 'A'. The control arm 52 will remain in its neutral position until the tension on the line is increased upon catching a suitable size fish which tension, is sufficient to move the arm to position 'A'. The reel assembly will then immediately reel in the caught fish.

As shown in FIG. 4, it is preferred that a trailing line 63 be left in the water at all times. This trailing line includes a suitable drag member 65 of sufficient size to move the control lever from the braking position to the neutral position to enable the line to be reeled-out after the fish has been disengaged from the hooks. The reel flanges 12 may include aligned apertures there through which a limit bar may pass outwardly of the base of the reel assembly 11. The limit pin (not shown) is inserted through the apertures after sufficient line has been payed-out. In automatic operation the line will thereafter be payed-out to the same extent.

If, for example the apparatus illustrated in FIGS. 1 to 4 is to be used for bottom fishing, then the control lever would be spring biassed to the neutral position and the switching means would be adapted to sequentially switch the respective electro-magnetic actuation so that upon line tension being relieved as the line reached the sea bottom, the lever would move to the neutral position. Upon catching a fish the clutch would be activated to wind in the fish until it was reeled in whereupon the brake would be actuated.

The fishing apparatus 10 is supported on a drive shaft 28 provided with square end portions 64 for driving interconnection with a driving shaft. Suitably a plurality of such fishing apparatus 10 could be set up in line across the back of a boat as illustrated in FIG. 5 and each could be interconnected by an intermediate driving shaft 9 suitably provided with snap-on connectors to connect to the square end portions 64. In this manner any selected number of reels could be coupled to a common driving means 8 which in use operates continuously, and which is a belt drive arrangement in the embodiment illustrated. Suitably, individual isolating switches are provided for each apparatus to enable an operator to isolate any selected apparatus 10.

In a further embodiment of the invention the clutch assembly and brake assembly may be actuated pneumatically or hydraulically in lieu of the electro-magnetic actuating means illustrated and if desired mechanical actuating means could be provided.

We claim:

1. Fishing apparatus including:
   a rotatable driving shaft;
   a fixed lay shaft supported concentrically about said driving shaft;
   a reel assembly mounted rotatably about said driving shaft for supporting a fishing line;
   a clutch assembly operable for selectively connecting said reel assembly to said driving shaft to reel in said line and including a driving clutch member rotatable with said driving shaft, a driven clutch member rotatable with said reel assembly, and electro-magnetic clutch actuating means supported on said lay shaft for coupling said clutch members;
   a brake assembly within a housing for selectively connecting said reel assembly to said lay shaft to stop rotation of said reel assembly and including a fixed braking member supported on said lay shaft, a rotatable braking member rotatable with said reel assembly, and electro-magnetic brake actuating means supported on said lay shaft for coupling said braking members; and
   a line monitoring means for monitoring the fishing line tension and for controlling said clutch and brake actuating means in response to changes in fishing line tension, said line monitoring means having a first control position at which said brake actuating means is actuated to couple said braking members to stop the reel assembly, and a second control position at which said clutch actuating means is actuated to couple said clutch members to connect said reel assembly to said driving shaft for rotation therewith.

2. Fishing apparatus according to claim 1, wherein said line monitoring means includes a pivotably mounted control lever adapted to pivot between said first and said second positions and a switch means operatively associated with said control lever for controlling both said electro-magnetic actuating means.

3. Fishing apparatus according to claim 2, wherein there is provided a selectively adjustable means for applying a variable braking effect to the pivotal movement of said pivotable control lever whereby a predetermined line tension is required to move said pivotable control lever to said second position.

4. Fishing apparatus according to claim 3, wherein said selectively adjustable means is a manual adjustor having a body which is externally threaded to engage threadedly within said housing.

5. Fishing apparatus according to claim 1, wherein said electro-magnetic clutch actuator is supported within said reel assembly and said electro-magnetic brake actuator is supported within a housing fixed to said lay-shaft and at one side of said reel assembly.

6. Fishing apparatus according to claim 1, wherein said line monitoring means includes a first line guide means spaced radially from said reel assembly and disposed substantially centrally thereof and a second line guide means disposed within the confines of a line holding portion of said reel assembly.

7. Fishing apparatus according to claim 1, wherein said reel assembly is a composite member including a metal hub portion and an outer line holding portion formed of plastics material.

8. Fishing apparatus according to claim 7, wherein said line holding portion is a two part member comprising a first side part being functionally integral with said hub portion and a second side part releasably secured to said first side part.

9. Fishing apparatus according to claim 8, wherein there are provided end plates fixed to said reel assembly to enclose said clutch assembly and said brake assembly.

10. An assembly comprising a plurality of automatic fishing apparatuses as claimed in claim 1, each said fishing apparatus being mounted in spaced longitudinal relationship along a driving shaft assembly and each said fishing apparatus being operable to rotate with or relative to said shaft assembly independently of the other said fishing apparatuses.

11. An assembly according to claim 10, wherein there is provided driving means adapted in use to continuously rotate said driving shaft assembly.

12. An assembly according to claim 11, wherein said driving shaft assembly includes a plurality of driving shafts each supporting a respective said fishing apparatus and interconnecting shafts adapted to drivingly interconnect said driving shafts together and wherein each driving shaft is supported by fixed supporting means at respective opposite ends of said fishing apparatus.

* * * * *